(12) United States Patent
Weinl et al.

(10) Patent No.: US 9,337,766 B2
(45) Date of Patent: May 10, 2016

(54) METHOD AND DRIVE APPARATUS FOR DRIVING AN ELECTROMAGNETIC ACTUATOR

(75) Inventors: Florian Weinl, Lindau (DE); Michael Pantke, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/343,918

(22) PCT Filed: Aug. 2, 2012

(86) PCT No.: PCT/EP2012/065141
§ 371 (c)(1),
(2), (4) Date: Mar. 10, 2014

(87) PCT Pub. No.: WO2013/041283
PCT Pub. Date: Mar. 28, 2013

(65) Prior Publication Data
US 2014/0203753 A1 Jul. 24, 2014

(30) Foreign Application Priority Data

Sep. 20, 2011 (DE) .......................... 10 2011 083 007

(51) Int. Cl.
*H02K 33/00* (2006.01)
*H02P 25/06* (2016.01)
(Continued)

(52) U.S. Cl.
CPC .............. *H02P 25/06* (2013.01); *H01F 7/1844* (2013.01); *H01F 13/006* (2013.01); *H01F 2007/185* (2013.01)

(58) Field of Classification Search
CPC .... B82Y 25/00; G01R 33/093; G01R 15/205; G01R 27/28; G01R 33/14; H02K 33/00

USPC .......................................................... 318/129
See application file for complete search history.

(56) References Cited

U.S. PATENT DOCUMENTS 6,494,083 B1    12/2002   Heuft
8,482,299 B2 *   7/2013   Pantke et al. ................. 324/654
(Continued)

FOREIGN PATENT DOCUMENTS

DE          198 34 185 A1    2/2000
DE      10 2006 046 736 A1    4/2008
(Continued)

OTHER PUBLICATIONS

Kondo, English translation of JP2004304921 "Electromagnetic actuator-controlling", Oct. 28, 2004, pp. 1-10.*
(Continued)

*Primary Examiner* — Eduardo Colon Santana
*Assistant Examiner* — Bickey Dhakal
(74) *Attorney, Agent, or Firm* — Davis & Bujold, P.L.L.C.; Michael J. Bujold

(57) ABSTRACT

A method of activating an electromagnetic actuator having at least one coil and a movable armature. The method includes the step in which the electromagnetic actuator is demagnetized by passing a sequence of electric current pulses with a current flow direction which alternates from one current pulse to the next and with a current size which decreases from one current pulse to the next, through the at least one coil, in order to reduce or eliminate any residual magnetic flux density in the electromagnetic actuator. The method also includes a step in which a position of the movable armature is determined, after the demagnetization step, by passing a measurement current pulse through the at least one coil.

11 Claims, 3 Drawing Sheets

(51) Int. Cl.
  *H01F 7/18*   (2006.01)
  *H01F 13/00*  (2006.01)

(56) References Cited

U.S. PATENT DOCUMENTS

2008/0204178 A1* 8/2008 Maranville et al. ........... 335/284
2011/0221451 A1  9/2011 Pantke et al.

FOREIGN PATENT DOCUMENTS

JP    H03-131716 A    6/1991
JP    2004304921 A  * 10/2004
WO    2010/049200 A1   5/2010

OTHER PUBLICATIONS

German Search Report Corresponding to 10 2011 083 007.3 mailed Jun. 18, 2012.
International Search Report Corresponding to PCT/EP2012/065141 mailed Oct. 30, 2012.
Written Opinion Corresponding to PCT/EP2012/065141 mailed Oct. 30, 2012.
Chinese Office Action issued in corresponding Chinese Application No. 201280045917.2 mailed Aug. 12, 2015.

* cited by examiner

METHOD AND DRIVE APPARATUS FOR DRIVING AN ELECTROMAGNETIC ACTUATOR

This application is a National Stage completion of PCT/EP2012/065141 filed Aug. 2, 2012, which claims priority from German patent application serial no. 10 2011 083 007.3 filed Sep. 20, 2011.

FIELD OF THE INVENTION

The present invention relates to a method for driving an electromagnetic actuator and to a driving device for driving an electromagnetic actuator.

BACKGROUND OF THE INVENTION

An electromagnetic actuator comprises at least one armature and, for example, two coils. The actuator can also comprise two permanent magnets. The position of the armature in the coils produces various inductances. In a method for activating the actuator, for example during an abruptly increasing energizing current, the voltage variation at the two coils can be measured. From these measurement data it is possible, for example in a differentiator, to compute a third voltage variation or a sensor signal from which a logic unit can determine the position of the armature. Thus, the position can be determined by evaluating the inductances prevailing at the coils.

In ferromagnetic materials the relationship between magnetic field strength H and flux density B is non-linear and depends on the previous history. Responsible for this are magnetic flux densities that influence the inductance and hence the sensor signal. The magnetic flux density in ferromagnetic components depends on the strength of the prevailing magnetic field. If the prevailing magnetic field decreases, ferromagnetic components have some residual magnetism. Depending on the direction and strength of the previously applied magnetic field, the flux density of the residual ferromagnetism can vary. Since the magnetic flux density has to be evaluated, it is accordingly possible for a position signal to be obtained, which is made erroneous owing to different previous histories. This effect is not desired in measurement instruments and sensors, but it occurs frequently, particularly when magnetic systems are part of the measurement value receiver. Furthermore, temperature fluctuations influence the residual magnetism remaining and thus, in turn, the position detection.

WO 2010/049200 A1 relates to a method for detecting the position of a magnetic armature of an electromagnetic actuator arranged between two coils.

SUMMARY OF THE INVENTION

Against that background the present invention provides an improved method for actuating an electromagnetic actuator, and an improved activating device for activating an electromagnetic actuator. Advantageous design features emerge from the description below.

The present invention provides a method for activating an electromagnetic actuator which comprises at least one coil and a movable armature, the method having the following steps:

Demagnetization of the electromagnetic actuator by passing a series of electric current pulses through the at least one coil, the current flow direction alternating and decreasing from one pulse to the next, in order to reduce or eliminate any residual flux density in the electromagnetic actuator; and Determination of a position of the movable armature by passing a measurement current pulse through the at least one coil, after the demagnetization step.

The electromagnetic actuator can be understood to be an active component or converter capable of converting electronic signals or electric current, by means of electromagnetism, for example into mechanical movement. This conversion can be effected by means of the at least one coil. The turns of the at least one coil can at least partially surround a space within which the movable armature is displaced. The movable armature can be mechanically connected to an element that has to be moved. Likewise, the movable armature itself can be moved by movement of the element to which it is mechanically connected. The movable armature can be made of a ferromagnetic material. Other components of the electromagnetic actuator can also be made from a ferromagnetic material. The movable armature can be moved electromagnetically when electric current is passed into the at least one coil. It is also possible to provide a plurality of movable armatures in the electromagnetic actuator. The demagnetization process reduces, or removes or eliminates the residual flux density. The residual flux density can also be called magnetic remanence, or remnant or residual magnetism, remaining magnetism, residual magnetization or magnetic hysteresis. The residual flux density is the magnetic flux density that remains in a particle of ferromagnetic material previously magnetized for example by the magnetic field produced by the at least one coil, after the magnetic field has been removed. During demagnetization an alternating magnetic field is applied, which at first has the coercive field strength and whose field strength then gradually decreases. By virtue of demagnetization a ferromagnetic material that has become permanently magnetic can lose its magnetic polarization. Such an alternating magnetic field can be produced by a sequence of electric current pulses. For this, the at least one coil of the electromagnetic actuator has currents with alternating flow directions passed through it. In this sequence of electric current pulses, the pulses have decreasing current strength or amplitude. Thus, each electric current pulse flows in the opposite direction to, and has a higher current strength than an electric current pulse that comes immediately after it. Similarly, each pulse flows in the opposite direction to and has a lower current strength than a pulse immediately before it. Accordingly, during demagnetization, the sequence of electric current pulses produces a series of hysteresis loops until the residual flux density is zero or virtually zero. A position of the movable armature relative to the coil can be determined by means of the measurement current pulse. To determine the position, it is also possible to pass a plurality of measurement current pulses through at least one coil.

The present invention also provides an activating device for activating an electromagnetic actuator, comprising at least one coil and a movable armature, which is characterized in that the activating device comprises means designed to implement the steps of the above-described method.

The activating device can be connected to the electromagnetic actuator by way of a communication interface. The activating device can be fixed to the electromagnetic actuator or arranged separately from it. In combination with the actuating device a method as described above can be advantageously implemented in accordance with embodiments of the present invention.

The present invention is based on the recognition that before a position determination by means of an electromagnetic actuator the ferromagnetic parts of the electromagnetic actuator have to be demagnetized in order as much as possible to eliminate any residual flux density in the ferromagnetic parts of the electromagnetic actuator, so that a position determination is advantageously possible. An ideal working point for the position determination and thus the least possible deviation due to temperature and previous history is obtained when the flux density is low. For the demagnetization, magnetic reversals are carried out with gradually decreasing field strength values, for example starting from saturation field strength.

An advantage of the present invention is that to increase the precision of position sensing with an electromagnetic actuator, residual magnetization or hysteresis is eliminated. In this way a defined and constant magnetic starting condition in the actuator can be produced at the beginning of the position determination or position measurement. In addition, this produces a magnetic starting condition or working point which is almost independent of temperature. Thus, a position measurement by means of an external armature movement—i.e. an armature movement without any energizing current—is much less, or even no longer at all prone to error. Thanks to the present invention, which for example provides an activation algorithm for residual magnetism elimination, this advantageous effect can be achieved. Owing to the low flux density produced by demagnetization and the associated lower permeability within the component, the magnetic field remains constant over a longer time or there is less magnetic ageing. Also because of the lower flux density in the component, ageing has less influence. Ferromagnetic materials have different magnetic-field-strength/flux-density curves or BH curves. The present invention can be used for any ferromagnetic components. In doing this, the demagnetization process can be optimized for different actuators, for example by an appropriate selection of the number of cycles and the current flow duration. The process can also be used when an actuator combines a number of different ferromagnetic components into one assembly. A further advantage of the present invention is that position information is acquired without using an additional position sensor, which saves space, costs and weight.

During this, in the demagnetization step a first electric current pulse with a first flow direction and a first current size is passed through the at least one coil, followed by a second electric current pulse with a second flow direction different from the first flow direction and a second current size smaller than the first current size. Such an embodiment of the present invention has the advantage that in this way demagnetization can be carried out particularly effectively.

Furthermore, in the demagnetization step at least one further electric current pulse can be passed through the at least one coil, which in relation to a current pulse immediately before it has an opposite flow direction and a smaller current size. Such an embodiment of the present invention has the advantage that in this way demagnetization can be carried out particularly effectively.

Thus, in the demagnetization step the sequence of electric current pulses have progressively decreasing current flow durations through the coil. The duration of the current flow through the coil, or energization time, influences the size or amplitude of the electric current pulse. The longer the duration of the current flow through the coil, the larger is its amplitude. The shorter the duration of current flow, the smaller its amplitude is. Such an embodiment of the present invention has the advantage that in this way the decreasing current size that results from a current flow duration through the coil which decreases from one pulse to the next, can be realized simply and effectively.

Moreover, in the determination step the size of the measurement current pulse can be smaller than the smallest of the current pulse sizes in the demagnetization step. In contrast to the hysteresis loops during demagnetization, the magnetic field strength introduced by a sensing cycle for determining the position of the armature does not produce any flux density change in the ferromagnet. The reason for this is the only slight effect on magnetic field strengths of the measurement current pulse. For example, only a few isolated magnetic domains are reversed. Thus, owing to the reversible magnetic field the working point still remains in substantially the same area.

Furthermore, a step of directing a movement current pulse through the at least one coil can be envisaged, in order to bring about movement of the armature. In this case the size of the movement current pulse can be larger than the largest current size of the current pulses in the demagnetization step. The movement current pulse, which because of the armature movement to be produced has to be of a certain size, can result in a magnetic field with the saturation field strength. Such an embodiment of the present invention has the advantage that an actuating function of the electromagnetic actuator can be carried out effectively.

The demagnetization step can be carried out after the movement step and before the determination step. Such an embodiment of the present invention has the advantage that even after an energization in order to move the movable armature, by virtue of the demagnetization a position determination protected as much as possible from falsification caused by residual magnetization is made possible.

In the determination phase, a reaction of the at least one coil to the movable armature can be evaluated in the measurement current pulse. The position of the armature influences a magnetic field of the at least one coil produced by the current pulse in order to determine the position of the movable armature. This influence on the magnetic field can be evaluated as a reaction, for example in the form of a voltage that can be tapped from the coil. Thus, the position of the movable armature relative to the coil can be determined. Such an embodiment of the present invention has the advantage that in this way the position of the movable armature can be determined simply and accurately. In addition the position can be determined by means of the at least one coil, which is already present in the electromagnetic actuator, so that costs, space and components can be saved. Accordingly, the electromagnetic actuator can both carry out its actuating functions and also indicate the position of its armature.

In an embodiment in which the electromagnetic actuator comprises a first coil and a second coil, in the demagnetization step the sequence of electric current pulses can be passed through the first and second coils connected in series. In the determination step as well, the measurement current pulse can be passed through the series circuit consisting of the first and second coils. For this the first and second coils are connected in series. Such an embodiment of the present invention has the advantage that movement of the movable armature can be brought about even more effectively and its position can be determined even more accurately.

In a preferred embodiment of the invention the electromagnetic actuator is an actuator in a vehicle, in particular a land vehicle. Of course, however, the method according to the invention can also be used with other suitable electromagnetic actuators, for example an actuator in an aircraft, in a marine vehicle or on a stationary device. Furthermore the electromagnetic actuator can be a transmission actuator, i.e. an actuator that brings about functions in a transmission, such as the coupling or decoupling of transmission shafts and/or gearwheels. In this way, with reference to the position of the movable armature determined by virtue of the method according to the invention, the performance of the transmission function brought about by the actuator can be monitored simply and reliably.

In a particularly preferred embodiment of the invention the actuator is a transmission actuator in a multi-gear automated variable-speed transmission. In this case the actuator in particular enables the selection of a shift gate of the automated variable-speed transmission and/or the engagement or disengagement of the gear in the particular shift gate selected. In this way, with reference to the position of the movable armature determined by the method according to the invention, the gear engaged or the shift gate of the automated transmission selected at the time can be detected simply and reliably.

BRIEF DESCRIPTION OF THE DRAWINGS

Below, an example of the invention is explained in more detail with reference to the attached drawings, which show.

DETAILED DESCRIPTION OF THE PREFERRED EMBODIMENTS

In the following description of preferred example embodiments of the present invention, the same or similar indexes are used for elements shown in the various figures and which act similarly, so eliminating the need for repeated descriptions of those elements.

Figure 1:
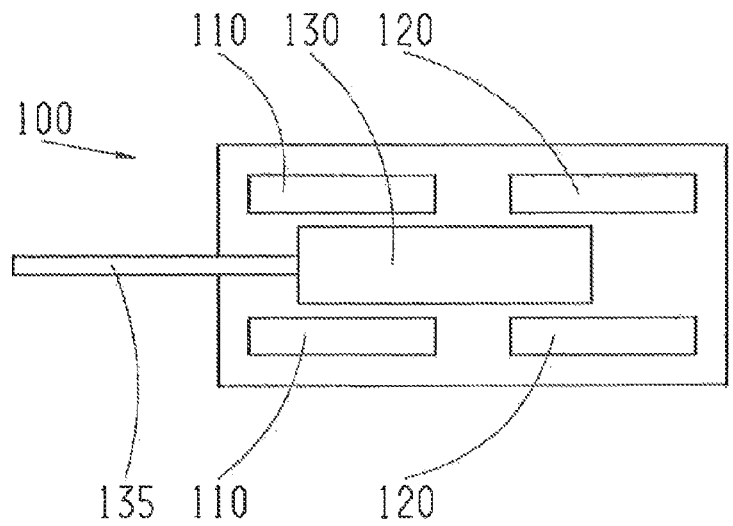
FIGS. 1 to 3: Schematic representations of electromagnetic actuators.

FIG. 1 shows a schematic representation of an electromagnetic actuator 100. The electromagnetic actuator 100 comprises a first coil 110, a second coil 120, a movable magnetic armature or movable armature 130 and a connecting rod 135. The structure of such an electromagnetic actuator 100 is sufficiently well known to a person with knowledge of the field and will therefore be explained only very briefly here. The first coil 110 and the second coil 120 surround a movement space of the movable armature 130. The movable armature 130 is designed to move within the movement space. The movement space is designed to enable a defined movement of the moveable armature 130. Thus, turns of the first coil 110 as well as turns of the second coil 120 surround the movement space of the movable armature 130. The movement space can have a main extension axis which passes through the first coil 110 and the second coil 120. In the representation shown in FIG. 1 the movable armature 130 is partially surrounded by the first coil 110 and partially by the second coil 120. The first coil 110 is laterally a distance away from the second coil 120. The connecting rod 135 is attached to the movable armature 130 and in this case extends out of a housing of the electromagnetic actuator 100. The connecting rod 135 can be connected to a movable element outside the electromagnetic actuator 100.

Figure 2:
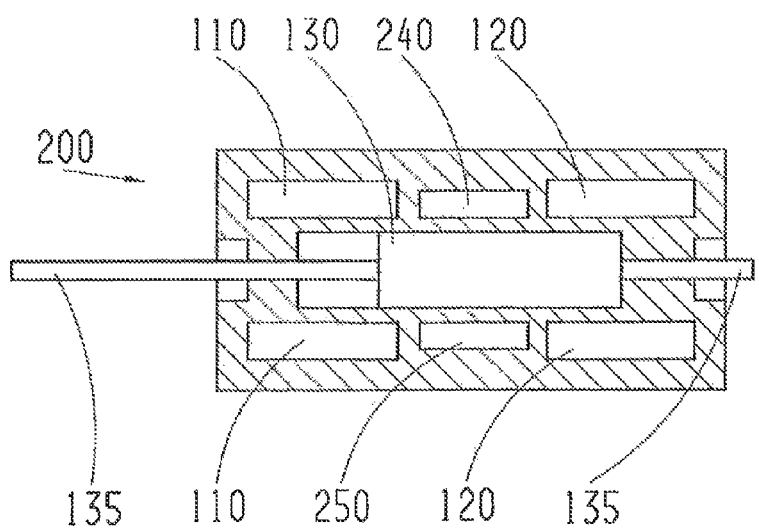

FIG. 2 shows a schematic representation of a further electromagnetic actuator 200. The electromagnetic actuator 200 corresponds to the electromagnetic actuator in FIG. 1, except in that the electromagnetic actuator 200 in FIG. 2 comprises in addition a first permanent magnet 240 and a second permanent magnet 250, and the connecting rod 135 is attached to two sides of the movable armature 130. In addition, a housing of the electromagnetic actuator 200 is shown in more detail. Thus for example, in FIG. 2 the movement space of the movable armature 130 is indicated explicitly. The movable armature 130 is held within the movement space, and can move therein between a first end and a second end thereof. The first permanent magnet 240 and the second permanent magnet 250 are arranged between the first coil 110 and the second coil 120. The movement space is arranged between the first permanent magnet 240 and the second permanent magnet 250, so that the first and second permanent magnets 240, 250 are arranged opposite one another on either side of the movement space. The connecting rod 135 extends out of the electromagnetic actuator 200 at the first end of the movement space and out of the electromagnetic actuator 200 at the second end of the movement space. At both ends of the movement space the connecting rod 135 is held and guided by the housing of the electromagnetic actuator 200.

Figure 3:
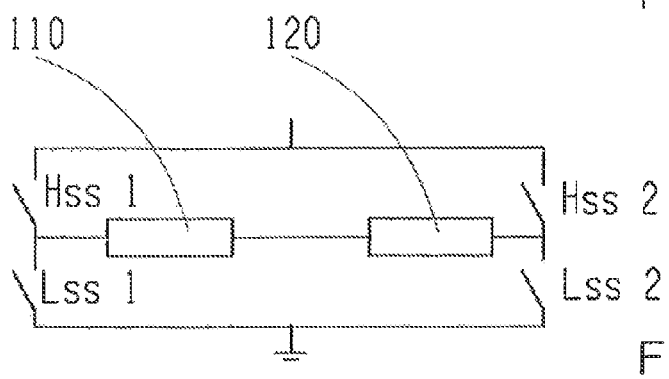

FIG. 3 shows a schematic representation of an electromagnetic actuator. More precisely, FIG. 3 shows a schematic circuit diagram for an electromagnetic actuator. Of the electromagnetic actuator, FIG. 3 shows only the first coil 110 and the second coil 120 as a block circuit diagram, as well as four switching devices. The electromagnetic actuator can be one of those shown in FIG. 1 or 2. As shown in FIG. 3, the coils 110, 120 are connected in series. In this case the series circuit is integrated in an H-bridge. Any of the switching devices shown in FIG. 3 can for example comprise a MOSFET (Metal Oxide Semiconductor Field-Effect Transistor) or the like. The switching devices comprise a first high-side switching device Hss1, a second high-side switching device Hss2, a first low-side switching device Lss1 and a second low-side switching device Lss2. The first high-side switching device Hss1 and the second high-side switching device Hss2 are connected upstream in the current flow direction of the series circuit of the coils 110, 120. The first low-side switching device Lss1 and the second low-side switching device Lss2 are connected downstream in the current flow direction of the series circuit of the coils 110, 120. By selective closing and opening of the MOSFETs or switching devices, the direction of a current flow through the coils 110, 120 can be set. The electric current generates a magnetic field, which brings about a positioning of the armature (not shown in FIG. 3). The mode of action of such an H-bridge is sufficiently well known in the field and will not therefore be explained in more detail here.

Figure 4:
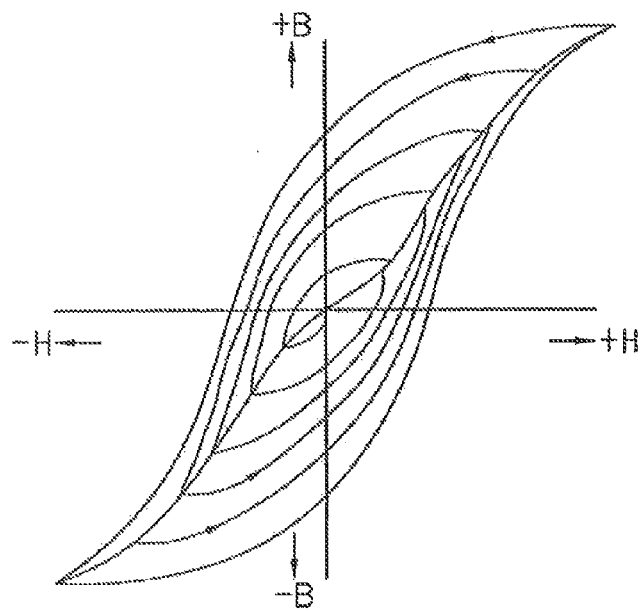
FIG. 4: A schematic hysteresis diagram.

FIG. 4 shows a schematic hysteresis diagram. In ferromagnetic materials there is a relationship between the magnetic field strength H and the flux density B. This relationship is described by the hysteresis diagram in FIG. 4, in which the magnetic field strength H is plotted on the abscissa and the flux density B on the ordinate axis. The relationship between the magnetic field strength H and the flux density B is non-linear. FIG. 4 shows a number of hysteresis loops. Magnetic hysteresis and the associated hysteresis diagrams are well known to a person familiar with the subject, and will therefore not be described again here.

Figure 5:
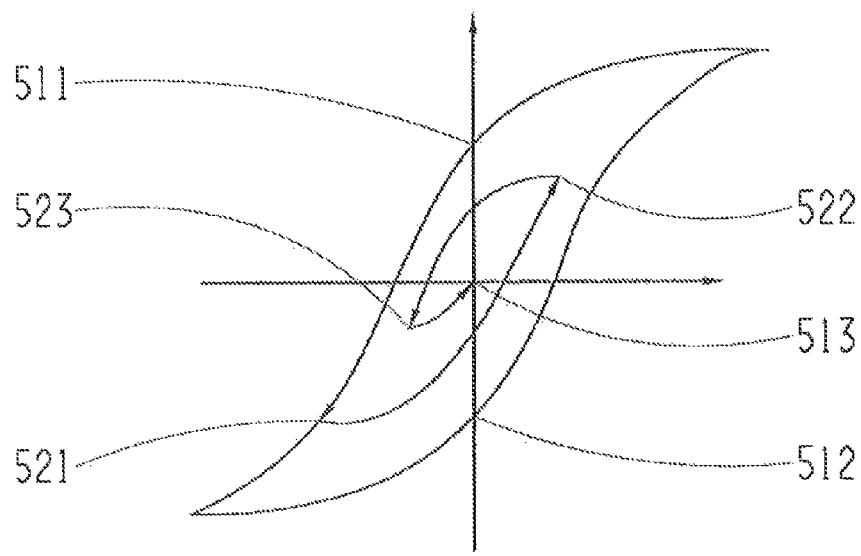
FIG. 5: A schematic hysteresis diagram in connection with an example embodiment of the present invention.

FIG. 5 shows a schematic hysteresis diagram in connection with an example embodiment of the present invention. Similarly to FIG. 4, FIG. 5 also shows the relationship between the magnetic field strength H and the flux density B. In this case the magnetic field strength H is plotted on the abscissa and the flux density B on the ordinate axis. The figure shows a first working point 511 with no passage through hysteresis loops, a second working point 512, also with no passage through hysteresis loops, a working point 513 after passing through hysteresis loops, a first hysteresis loop 521, a second hysteresis loop 522 and a third hysteresis loop 523.

The relationship between the magnetic field strength H and the flux density B is non-linear. Without the hysteresis loops the hysteresis curve starts from a maximum positive magnetic field strength H and positive flux density B in the first quadrant of the Cartesian co-ordinate system and extends in a non-linear manner, in a first curve section, to a maximum negative magnetic field strength H and negative flux density B in the third quadrant of the Cartesian co-ordinate system. During this the hysteresis curve intersects the ordinate axis at the first working point 511 without hysteresis loops, in the positive axis section. From the maximum negative magnetic field strength H and negative flux density B, the hysteresis curve extends in a non-linear manner, is a second curve section different from the first curve section, back to the maximum positive magnetic field strength H and positive flux density B. During this, however, the hysteresis curve intersects the ordinate axis at the second working point 512 without hysteresis loops, in the negative axis section.

The first hysteresis loop 521 begins at the first curve section in the third quadrant and extends non-linearly and nearer to the origin of the co-ordinate system than the first curve section, up to a first magnetization reversal point in the first quadrant. The second hysteresis loop 522 extends from the first magnetization reversal point in the first quadrant, in a non-linear manner, to a second magnetization reversal point in the third quadrant. The third hysteresis loop 523 extends from the second magnetization reversal point, non-linearly, to the origin of the co-ordinate system. Thus, at the origin of the co-ordinate system is the working point 513 obtained when the hysteresis loops are used. In practice the number of hysteresis loops can differ from that shown in FIG. 5.

An ideal working point 513, which depends as little as possible or not at all on previous history and temperature, is obtained at the smallest possible flux density B and exists at the origin of the diagram in FIG. 5. To minimize the flux density B at this working point 513, a demagnetization process is used. For demagnetization, a switching algorithm or control method is used, which will be explained in more detail with reference to FIG. 7. This switching algorithm is used in an example embodiment of a method according to the present invention, described in FIG. 7. The purpose of the switching is, by means of a number of hysteresis loops 521, 522, 523, to reduce the magnetic flux density B of a ferromagnetic material of the electromagnetic actuator gradually to the origin. As an example, FIG. 5 shows three such hysteresis loops 521, 522, 523 symbolically.

Figure 6:
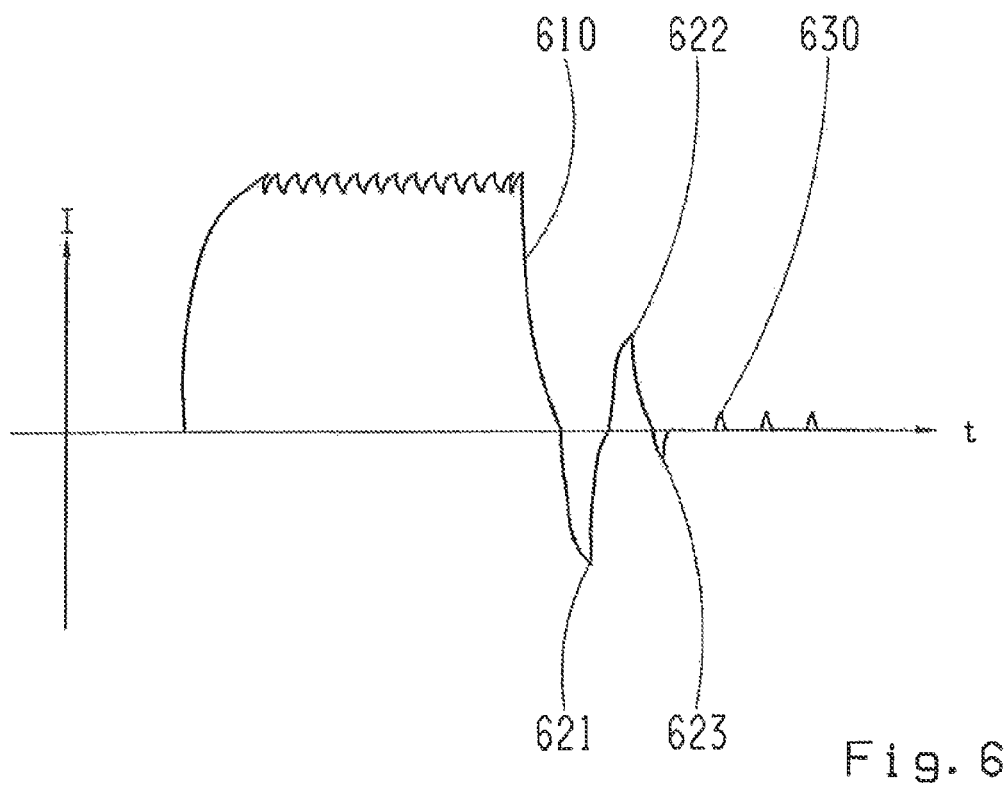
FIG. 6: An energizing current diagram in connection with an example embodiment of the present invention.

FIG. 6 shows an energizing current diagram in connection with an example embodiment of the present invention. The figure shows the variation of an electric current I, plotted on the ordinate axis, as a function of time t plotted on the abscissa. The figure shows an energization phase 610 for movement, a first hysteresis loop 621, a second hysteresis loop 622, a third hysteresis loop 623 and a first sensing cycle 630. The energization diagram in FIG. 6 is obtained when actuating an electromagnetic actuator such as one of those shown in FIGS. 1 to 3. During this the electric current I is applied to the at least one coil of the electromagnetic actuator. For demagnetization a switching algorithm or control process is implemented using the hysteresis loops 621 to 623, which will be explained in more detail with reference to FIG. 7. The switching algorithm is used in an example embodiment of a method according to the present invention, as described in FIG. 7.

In the energizing current phase 610 for movement, a high positive electric current is applied, in order to move a movable armature of the electromagnetic actuator. During the energizing current phase 610 the electric current I rises to a saturation value which is maintained for a certain time. During this the electric current I can fluctuate around the saturation value. At the end of the energization phase 610, the electric current I is reduced to zero. During the first hysteresis loop 621, a negative electric current pulse is applied. An amplitude in the first hysteresis loop is quantitatively smaller than the saturation value during the energization phase 610. In the second hysteresis loop 622 a positive electric current pulse with a quantitatively smaller amplitude than during the first hysteresis loop 621 is applied. In the third hysteresis loop 623, a negative electric current pulse with an amplitude quantitatively smaller than during the second hysteresis loop 622 is applied. Following the third hysteresis loop 623, in a first sensing cycle 630 a positive measurement current pulse is applied, whose amplitude is smaller than the amplitude during the third hysteresis loop 623. After the first sensing cycle 630, further sensing cycles with further positive measurement current pulses, for example of the same amplitude, can also follow.

Figure 7:
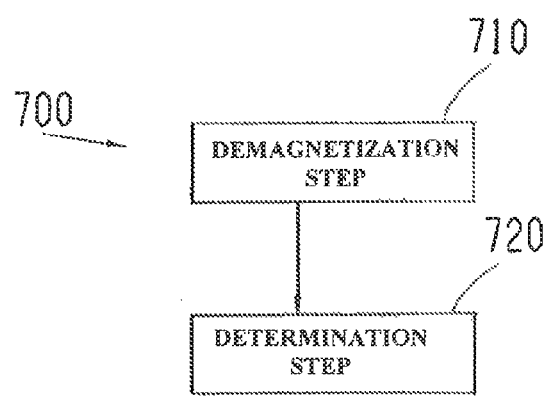
FIG. 7: A sequence diagram for a method according to an example embodiment of the present invention.

FIG. 7 shows a sequence diagram of a method 700 according to an example embodiment of the present invention. The method 700 is a method for activating an electromagnetic actuator comprising at least one coil and a movable armature. The method 700 comprises a step 710 in which the electromagnetic actuator is demagnetized by passing a sequence of electric current pulses through the at least one coil with a flow direction that alternates between one current pulse and the next, and with a current size that decreases from one current pulse to the next, in order to reduce or eliminate any residual magnetic flux density in the electromagnetic actuator. The method 700 also comprises a step 720 in which a position of the movable armature is determined by passing a measurement current pulse through the at least one coil after the demagnetization step 710. The method 700 can be carried out advantageously in combination with any of the electromagnetic actuators shown in FIGS. 1 to 3. During this, an embodiment of the method 700 can result in a hysteresis diagram such as that shown in FIG. 5. In the method, an energization sequence similar to that shown in FIG. 6 can be used.

Referring to FIGS. 1 to 7, below a control sequence of an electromagnetic actuator with demagnetization prior to the position determination in accordance with an example embodiment of the present invention will be explained again in summary fashion. The switching algorithm 710 for the hysteresis loops 521 to 523 or 621 to 623 should always be used before a position measurement 720 or the first sensing cycle 630. The time sequence is therefore designed as illustrated schematically in FIG. 6. For the demagnetization 710 the same hardware is used as also for the activation process 610 for movement. After an energization phase 610 there is a pause until the current has been reduced to zero and then the current is passed through the first coil 110 and the second coil 120 in alternating directions and with progressively decreasing amplitude. Thus, a plurality of hysteresis loops are followed. The hysteresis loop(s) shown in FIG. 6 is/are based on an energization cycle. By virtue of an appropriate choice of amplitudes and number of cycles, the method 700 can be optimized for any desired actuator. For this, besides the energization durations which influence the current amplitude, the pause length or time until the current falls to zero can be adapted. After passing through the final hysteresis loop 523 or 623 and thereby completing the demagnetization, the first position determination in the form of the first sensing cycle 630 can begin.

The example embodiments described and illustrated in the figures have been chosen only as examples. Different example embodiments can be combined with one another completely or in relation to particular features. Furthermore, one example embodiment can be supplemented by features of another example embodiment.

INDEXES

100 Electromagnetic actuator
110 First coil
120 Second coil
130 Movable armature
135 Connecting rod
200 Electromagnetic actuator
240 First permanent magnet
250 Second permanent magnet
Hss1 First high-side switching device
Hss2 Second high-side switching device
Lss1 First low-side switching device
Lss2 Second low-side switching device
511 First working point with no hysteresis loops
512 Second working point with no hysteresis loops
513 Working point with hysteresis loops
521 First hysteresis loop
522 Second hysteresis loop
523 Third hysteresis loop
610 Current energization phase for movement
621 First hysteresis loop
622 Second hysteresis loop
623 Third hysteresis loop
630 First sensing cycle
700 Activation method
710 Demagnetization step
720 Determination step

The invention claimed is:

1. A method of activating an electromagnetic actuator which has at least one coil and a movable armature, the method comprising the steps of:
    demagnetizing the electromagnetic actuator by passing a sequence of electric current pulses which have a current flow direction which alternates and a current size which progressively decreases, from one current pulse to a next current pulse, through the at least one coil, in order to either reduce or eliminate any residual magnetic flux density in the electromagnetic actuator and produce a defined and constant magnetic starting condition in the actuator before determining a position of the movable armature;
    determining the position of the movable armature, only after demagnetizing the electromagnetic actuator and achieving the defined and constant magnetic starting condition in the actuator, by passing a measurement current pulse through the at least one coil; and
    passing, during the determination step, a measurement current pulse through the at least one coil that has a current size which is smaller than the smallest of the current size of the current pulses during the demagnetization step.

2. The method according to claim 1, further comprising the step of passing through the at least one coil during the demagnetization step, a first electric current pulse with a first flow direction and a first current size, and a subsequent, second electric current pulse with a second current flow direction different from the first current flow direction and a second current size smaller than the first current size.

3. The method according to claim 2, further comprising the step of passing through the at least one coil, during the demagnetization step, at least one further electric current pulse with a flow direction opposite to that of an immediately preceding current pulse, and a current size Smaller than that of the immediately preceding current pulse.

4. The method according to claim 1, further comprising the step of progressively reducing, during the demagnetization step, a duration of the current flow through the at least one coil from one current pulse to the next current pulse through the sequence of electric current pulses.

5. The method according to claim 1, further comprising the step of passing a movement current pulse through the at least one coil to move the armature, and the movement current pulse having a current size that is larger than the largest of the current size of the current pulses which pass during the demagnetization step.

6. The method according to claim 5, further comprising the step of carrying out the demagnetization step after passing the movement current pulse through the at least one coil and before the determination step.

7. The method according to claim 1, further comprising the step of evaluating, during the determination step, a reaction of the at least one coil to the movable armature in the measurement current pulse to determine the position of the movable armature.

8. The method according to claim 1, wherein the electromagnetic actuator has a first coil and a second coil, the method further comprising the step of passing, during the demagnetization step, the sequence of electric current pulses through a series circuit of the first coil and the second coil, and passing, during the determination step, the measurement current pulse through the series circuit of the first coil and the second coil.

9. A method of activating an electromagnetic actuator which has at least one coil and a movable armature, the method consisting of the steps to:
    demagnetizing the electromagnetic actuator by passing a sequence of electric current pulses which have a current flow direction which alternates, and a current size which progressively decreases, from one current pulse to a next current pulse, through the at least one coil, in order to either reduce or eliminate any residual magnetic flux density in the electromagnetic actuator;
    determining a position of the movable armature, after the step of demagnetizing the electromagnetic actuator, by passing a measurement current pulse through the at least one coil; and
    passing, during the determination step, a measurement current pulse through the at least one coil hat has a current size which is smaller than the smallest of the current size of the current pulses during the demagnetization step.

10. An activating device for activating an electromagnetic actuator comprising:
    at least one first and second coil surrounding an armature movement space; and
    a movable magnetic armature, being located in and being axially movable within the armature movement space, with respect to a housing of the electromagnetic actuator, by a connecting rod, and the activating device being capable of:
        demagnetizing the electromagnetic actuator by passing a sequence of electric current pulses with a current flow direction which alternates, and a current size which progressively decreases, from one current pulse to a next current pulse, through the at least one first and the second coil, in order to either reduce or eliminate any residual magnetic flux density in the electromagnetic actuator and produce a defined and constant magnetic starting condition in the actuator before determining an axial position of the movable armature;

determining the axial position of the movable armature, only after demagnetizing the electromagnetic actuator and achieving the defined and constant magnetic starting condition in the actuator, by passing a measurement current pulse through both of the at least one first and the second coil; and the activating device, when determining the axial position of the movable armature, passes a measurement current pulse through the at least one first and second coil that has a current size which is smaller than the smallest of the current size of the current pulses during the demagnetization step.

11. The activating device according to claim 10, wherein activating device further comprises four switching devices;

at least one of the four switching devices comprises a metal oxide semiconductor field-effect transistor; and the four switching devices further comprises a first high-side switching device (Hss1), a second high-side switching device (Hss2), a first low-side switching device (Lss1) and a second low-side switching device (Lss2);

the first high-side switching device and the second high-side switching device are connected upstream in the current flow direction, and the first low-side switching device and the second low-side switching device are connected downstream in the current flow direction so that the current flow direction, through the first and the second coils, connected in series, can be set by selective closing and opening of the four switching devices.

* * * * *